US010074382B2

(12) United States Patent
Hoerich et al.

(10) Patent No.: US 10,074,382 B2
(45) Date of Patent: Sep. 11, 2018

(54) METHOD FOR BITRATE SIGNALING AND BITSTREAM FORMAT ENABLING SUCH METHOD

(71) Applicant: DOLBY INTERNATIONAL AB, Amsterdam Zuidoost (NL)

(72) Inventors: Holger Hoerich, Fürth (DE); Alexander Groeschel, Nuremberg (DE); Jens Popp, Nuremberg (DE); Marc Roessler, Nuremberg (DE); Malte Schmidt, Feucht (DE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 15/100,583

(22) PCT Filed: Nov. 27, 2014

(86) PCT No.: PCT/EP2014/075799
§ 371 (c)(1),
(2) Date: May 31, 2016

(87) PCT Pub. No.: WO2015/082298
PCT Pub. Date: Jun. 11, 2015

(65) Prior Publication Data
US 2016/0300586 A1    Oct. 13, 2016

Related U.S. Application Data

(60) Provisional application No. 61/986,351, filed on Apr. 30, 2014.

(30) Foreign Application Priority Data

Dec. 2, 2013   (EP) ..................................... 13195368

(51) Int. Cl.
*G10L 25/03* (2013.01)
*H04N 21/24* (2011.01)
(Continued)

(52) U.S. Cl.
CPC .............. *G10L 25/03* (2013.01); *G10L 19/00* (2013.01); *G10L 19/167* (2013.01);
(Continued)

(58) Field of Classification Search
CPC ......... G06F 2009/45595; G06F 9/4558; G06F 3/0482; G06F 17/30017
(Continued)

(56) References Cited

U.S. PATENT DOCUMENTS 5,134,476 A    7/1992   Aravind
5,159,447 A    10/1992  Haskell
(Continued)

FOREIGN PATENT DOCUMENTS

JP    2001-339718    12/2001
JP    2002-218458    8/2002
(Continued)

OTHER PUBLICATIONS

IEEE 754 Converter, archive of web page of IEEE 754 Converter, May 6, 2012.*
(Continued)

*Primary Examiner* — Pierre-Louis Desir
*Assistant Examiner* — Yi-Sheng Wang

(57) ABSTRACT

The present document relates to the determination of a bitrate related to an encoded bitstream, and describes a method for determining an estimate of a bitrate of a bitstream comprising a sequence of frames comprising a varying number of bitsand corresponding to excerpts of an audio and/or video signal. At least two frames of the sequence of frames comprise a parameter indicative of a processing (Continued)

Figure 1:
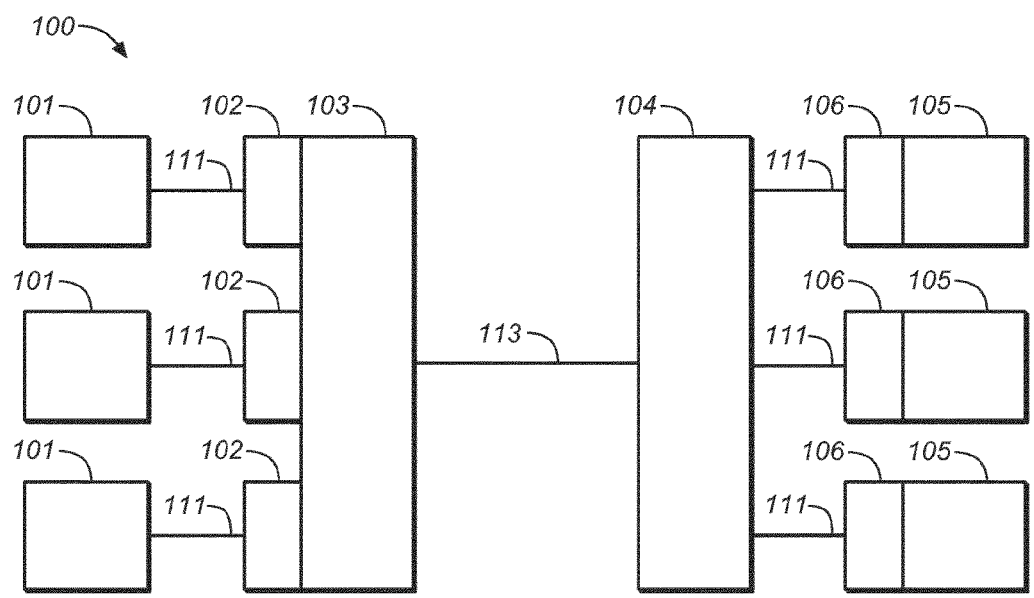

delay for the corresponding frame. The method comprises determining: a total number of bits for a subsequence of frames from the bitstream; a corrected number 201 of frames based on a number of frames comprised within the subsequence and the parameters of at least two frames of the subsequence; and a lower bitrate bound and an upper bitrate bound of the bitrate based on the total number of bits, the corrected number of frames and a frame rate of the bitstream.

20 Claims, 2 Drawing Sheets

(51) Int. Cl.
    *G10L 19/16*    (2013.01)
    *H04N 21/234*   (2011.01)
    *G10L 19/00*    (2013.01)
    G11B 20/00    (2006.01)
    G11B 20/10    (2006.01)

(52) U.S. Cl.
    CPC ... *H04N 21/23406* (2013.01); *H04N 21/2402* (2013.01); *G11B 2020/00036* (2013.01); *G11B 2020/10703* (2013.01)

(58) Field of Classification Search
    USPC ........................................................ 704/229
    See application file for complete search history.

(56) References Cited

U.S. PATENT DOCUMENTS

| | | | |
|---|---|---|---|
| 6,208,759 B1 | 3/2001 | Wells | |
| 6,574,593 B1 | 6/2003 | Gao | |
| 7,263,126 B2 | 8/2007 | Zhao | |
| 8,031,776 B2 | 10/2011 | Han | |
| 8,107,531 B2 | 1/2012 | Regunathan | |
| 8,229,159 B2 | 7/2012 | Tourapis | |
| 8,502,706 B2 | 8/2013 | Vandanapu | |
| 8,510,107 B2 | 8/2013 | Nemiroff | |
| 2003/0061038 A1* | 3/2003 | Faller | H04B 1/66 704/229 |
| 2005/0021830 A1* | 1/2005 | Urzaiz | H04L 47/10 709/234 |
| 2005/0036549 A1 | 2/2005 | He | |
| 2010/0150168 A1* | 6/2010 | Chatterjee | H04N 21/2365 370/465 |
| 2011/0090960 A1 | 4/2011 | Leontaris | |
| 2012/0027083 A1 | 2/2012 | Narroschke | |
| 2013/0138445 A1 | 5/2013 | Lee | |
| 2013/0287120 A1 | 10/2013 | Kwon | |
| 2015/0032851 A1* | 1/2015 | Lieber | H04L 65/602 709/219 |
| 2015/0156450 A1* | 6/2015 | Le Garjan | H04N 5/781 386/326 |

FOREIGN PATENT DOCUMENTS

| | | |
|---|---|---|
| JP | 2007-095121 | 4/2007 |
| JP | 2008-097781 | 4/2008 |
| JP | 2010-141479 | 6/2010 |
| JP | 2011-257870 | 12/2011 |
| JP | 2012-135009 | 7/2012 |

OTHER PUBLICATIONS

Luthi & Even, "RTP Payload Format for ITU-T Recommendation G.722.1 draft-ieft-avt-rfc3047-bis-09" Apr. 2009.

ETSI Draft Digital Audio Compression (AC-4) Standard: Draft ETSI TS 103 190 v1.1.2, European Telecommunications Standard Institute, Feb. 13, 2014, pp. 1-282.

\* cited by examiner

METHOD FOR BITRATE SIGNALING AND BITSTREAM FORMAT ENABLING SUCH METHOD

CROSS-REFERENCE TO RELATED APPLICATIONS

This application claims the benefit of priority to European Patent Application No. 13195368.9 filed 2 Dec. 2013 and U.S. Provisional Patent Application No. 61/986,351 filed 30 Apr. 2014, which are hereby incorporated by reference.

TECHNICAL FIELD

The present document relates to the determination of a bitrate related to an encoded bitstream.

BACKGROUND

In order to facilitate transmission of an encoded bitstream over a constant bitrate channel, a sending device typically needs information on the bitrate which has been applied when encoding said bitstream. Furthermore, information regarding the bitrate of an encoded bitstream may be needed at a multiplexing device which is configured to multiplex a plurality of encoded bitstreams into a joint bitstream. An example for such a multiplexing device is an MPEG-2 Transport Stream multiplexer. Also a decoding device may need information on the bitrate which has been applied when encoding said bitstream.

A (more or less) rough estimate of the applied bitrate may e.g. be estimated from the actual size of received frames of the encoded bitstream. The quality of such an estimate is, however, dependent on the type of bitstream. Possible types of bitstreams are e.g. constant bitrate (CBR), variable bitrate (VBR) or average bitrate (ABR) bitstreams. A CBR bitstream typically does not require the explicit signaling of a bitrate, because the frames of the bitstream usually have a substantially constant size. On the other hand, in case of a VBR bitstream, the momentary bitrate may vary substantially, such that the quality of an estimate of the bitrate based on the frame size is typically relatively low.

An ABR bitstream exhibits a bitrate which is to be achieved "in average" by the bitstream. A multiplexing device and/or a decoding device of the ABR bitstream typically comprise a buffer of a pre-determined size (e.g. of a pre-determined number of frames and/or of a fixed size in bytes), in order to be able to handle momentary variations of the bitrate. Such bitstreams are called to adhere to a "buffer model". The present document addresses the technical problem of determining the bitrate of such an ABR bitstream in an efficient and precise manner. In this context, it may be desirable to provide an efficient scheme for signaling information regarding the bitrate, notably in order to increase the accuracy of a bitrate estimate and/or in order to reduce the number of bits which are required for encoding the bitrate information.

The described methods may also be applied to other types of bitstreams. By way of example, the described method may be applied to VBR bitstream in order to determine an indicator of a target or average bitrate of the VBR bitstream.

SUMMARY

According to an aspect, a method for determining an estimate $br_{est}$ of the bitrate br of a bitstream is described. The bitstream comprises a sequence of frames. The frames of the sequence of frames correspond to excerpts of an audio and/or of a video signal. In particular, the frames of the sequence of frames may correspond to excerpts of an audio and/or of a video signal, wherein the excerpts (e.g. all excerpts) have a constant temporal length. On the other hand, the frames of the sequence of frames may comprise a varying number of bits. In other words, the momentary bitrate of the bitstream may vary. At the same time, the bitstream may exhibit a bitrate which is constant in average but which adheres to a buffer model. A bitstream having such a bitrate may be referred to as an average bitrate (ABR) bitstream. The bitstream may comprise an AC-4 bitstream.

At least two frames of the sequence of frames may comprise a wait_frames parameter. The wait_frames parameter of a frame may be indicative of a processing delay for the corresponding frame. In particular, the wait_frames parameter of a frame may be indicative of a number of frames that the corresponding frame is to be delayed, prior to processing. As such, the wait_frames parameter may provide buffering instructions to a multiplexing device and/or to a decoding device which process the bitstream. The wait_frames parameter is one way of signaling the state of the buffer model, other ways are e.g. using a buffer fullness value of a FIFO timing.

The method comprises determining a total number of bits or the total size $S_{Tot}$ for a subsequence of frames from the bitstream. In particular, the total number of bits $S_{Tot}$ of N frames from the subsequence may be determined. The subsequence may be selected from the bitstream based on information comprised within some of the frames of the bitstream. In particular, the subsequence may be selected based on a bitrate code parameter comprised within at least two frames of the sequence of frames.

As indicated above, the number of bits (also referred to as the size) of the frames may vary. As such, the total number of bits $S_{Tot}$ may be higher or lower than N times the average number of bits/frame (depending on whether the subsequence comprises frames having a relatively larger size or a relatively smaller size). Information regarding the size of the frames of the subsequence relative to the average size of a frame may be derived from the buffering information, i.e. from the wait_frames parameters. The method therefore comprises determining a corrected number N' of frames based on a number of frames comprised within the subsequence (notably based on the number N of frames which have been used to determine the total number of bits $S_{Tot}$) and based on the wait_frames parameters of at least two frames of the subsequence. As such, the effect of frames having a varying size may at least partially be compensated.

Furthermore, the method comprises determining a lower bound $br_{min}$ and an upper bound $br_{max}$ of the bitrate br based on the total number of bits $S_{Tot}$, based on the corrected number N' of frames and based on a frame rate $f_{frame}$ of the bitstream. The frame rate $f_{frame}$ of the bitstream may be constant (at least for the analyzed subsequence). The lower bound $br_{min}$ and the upper bound $br_{max}$ provide an estimate $br_{est}$ of the bitrate br, because it may be confirmed that the bitrate lies within the interval $[br_{min}, br_{max}]$.

By taking into account the wait_frames parameter, i.e. by taking into account buffering information, the precision of the estimate $br_{est}$ may be improved without using additional overhead of the bitstream for signaling bitrate information. It can be shown that in case of an AC-4 bitstream, the precision of the estimate $br_{est}$ may be improved by a factor ⅙ when considering the wait_frames parameter. Typically the possible improvement of the precision depends on the average frame size of the frames of the bitstream and/or on the maximum size of the buffer.

The corrected number N' of frames may be determined based on a difference between the wait_frames parameters of a first frame and a second frame from the subsequence. In particular, the first frame may correspond to the frame at the beginning of the subsequence and/or the second frame may correspond to the frame at the end of the subsequence. As such, the "evolution" of the buffer during the transmission of the subsequence may be determined and may be taken into account in order to increase the precision of the bitrate estimate $br_{est}$.

Typically, the buffering information, i.e. the wait_frames parameters have a pre-determined resolution which corresponds to a number of frames. By consequence, the corrected number N' may typically only be corrected up to the precision of one frame. The lower bound $br_{min}$ may therefore be determined based on the corrected number N' plus 1 and/or the upper bound $br_{max}$ may be determined based on the corrected number N' minus 1.

The subsequence of frames may comprise N+1 frames n, with n=0, ..., N. The frame n=0 at the beginning of the subsequence may comprise a wait_frames parameter, referred to as wait_frames (0), and the frame n=N at the end of the subsequence may comprise a wait_frames parameter, referred to as wait_frames(N). The total number of bits $S_{Tot}$ may be determined for N frames of the subsequence (e.g. the first or the last frame of the subsequence may not be taken into account when determining $S_{Tot}$). By way of example, the wait_frames parameter of a frame may be indicative of a processing delay relative to an end of the corresponding frame. In such a case, the total number of bits $S_{Tot}$ may be determined as $S_{Tot} = \Sigma_{n=1}^{N} S_n$, wherein $S_n$ is the number of bits (or the size) of frame n of the subsequence.

The corrected number N' of frames may then be determined by offsetting N using a difference between wait_frames(0) and wait_frames(N). In particular, the corrected number N' of frames may be determined as N'=N+wait_frames(0)−wait_frames(N).

Overall, the lower bound may be given by $$br_{min} = \frac{S_{Tot}}{(N'+1)} \times f_{frame}$$

and/or the upper bound may be given by $$br_{max} = \frac{S_{Tot}}{(N'-1)} \times f_{frame}.$$

At least some frames of the sequence of frames may comprise a bitrate code parameter. A value of the bitrate code parameter (e.g. a particular bit combination of the bitrate code parameter) may correspond to a start code and/or a stop code. The subsequence of the bitstream, which is used to determine the upper and lower bounds, may be determined (e.g. may be selected) from the sequence of frames based on the start code and/or the stop code. In particular, the subsequence may be determined such that the frame at the beginning of the subsequence comprises a bitrate code parameter which corresponds to the start code, such that the frame at the end of the subsequence comprises a bitrate code parameter which corresponds to the stop code, and such that no other frame of the subsequence comprises a bitrate code parameter which corresponds to the start code or the stop code.

As such, the bitrate code parameter may provide an efficient means for signaling the fact that a new bitrate br is to be estimated. By way of example, the state code and/or the stop code may be used by an encoding device to inform a multiplexing device and/or a decoding device that the bitrate (e.g. the ABR bitrate) of the bitstream has changed. The start code may be equal to the stop code, thereby further reducing the overhead which is required for signaling the fact that a new bitrate is to be estimated.

In view of the fact that the wait_frames parameter is used for determining the (rough) estimate of the bitrate, only frames which comprise a wait_frames parameter may comprise a bitrate code parameter. As a result, the overhead caused by the bitrate code parameter may be reduced further.

As such, the method may comprise steps for determining a (more or less) rough estimate $br_{est}$ of the bitrate br (notably the upper and lower bounds $br_{min}$, $br_{max}$), based on the wait_frames parameters comprised within the bitstream. Alternatively or in addition, the method may comprise the step of providing such an initial (e.g. rough) estimate of the bitrate, and a further step of increasing the precision of the initial estimate using additional bitrate information which is comprised within the bitstream. In particular, the method may comprise the step of increasing the precision of an initial estimate using values of the bitrate code parameter which is comprised within one of more frames of the bitstream. As such, a method which is directed at increasing the precision of an initial estimate of the bitrate is described. For such a method, the above mentioned method steps may be summarized by an overall step of providing an initial estimate $br_{est}$ of the bitrate br (e.g. of providing the upper and lower bounds $br_{min}$, $br_{max}$ of the bitrate br of the bitstream).

The estimate $br_{est}$ of the bitrate br of the bitstream may be representable in a floating point representation comprising a mantissa $f_{brCorr}$ and an exponent k. The exponent k may be determined based on the lower bound $br_{min}$ and/or based on the upper bound $br_{max}$ of the bitrate br. The mantissa $f_{brCorr}$ may be determined based on the bitrate code parameter of one or more frames of the subsequence. In particular, the floating point representation may be a binary floating point representation such that $br_{est} = f_{brCorr} \times 2^k$. In such a case, the mantissa $f_{brCorr}$ may take on values between 1 and 2. As such, the mantissa (also referred to herein as the bitrate correction factor) $f_{brCorr}$ may be used to increase the precision of an intial estimate given by the exponent k.

The method may comprise determining at least two potential exponents $K_1$ and $K_2$, such that $K_1 = \lfloor \log_2(br_{min}) \rfloor$ and $K_2 = K_1 + 1$. Furthermore, the method may comprise determining at least two intermediate estimates $br_x$, with $x \in \{1; 2\}$, such that $br_x = f_{brCorr} \times 2^{K_x}$. One of the at least two intermediate estimates $br_x$ may be selected as the estimate $br_{est}$ of the bitrate br, such that $br_{min} \leq br_x < br_{max}$ for $x \in \{1; 2\}$. The use of at least two potential exponents $K_1$ and $K_2$ is beneficial, in order to ensure uniqueness of the bitrate estimate $br_{est}$, notably in cases where the bitrate br is close to or equal to a number $2^k$.

If none of the at least two intermediate estimates $br_x$ meets the condition $br_{min} \leq br_x < br_{max}$, then the estimate $br_{est}$ of the bitrate br may be determined as a value comprised within the interval $[br_{min}, br_{max}]$. Such cases may occur if the bitrate estimate provided by $[br_{min}, br_{max}]$ is already sufficiently precise. The value comprised within the interval $[br_{min}, br_{max}]$ may be a mean value of the lower bound $br_{min}$ and of the upper bound $br_{max}$. Alternatively or in addition, a value having an increased probability to be the bitrate br compared to other values of the interval [$br_{min}$, $br_{max}$] may be selected (e.g. a typical value for the bitrate br, such as a bitrate given by $2^k$).

The bitrate code parameter of a frame may take on L different bitrate code values, with L being an integer greater than one. The L bitrate code values are typically different from the start code and/or stop code. As such, the bitrate code parameter may take on values which correspond to the start code and/or stop code, as well as L different bitrate code values. The mantissa $f_{brCorr}$ may depend on the bitrate code values of one or more frames of the subsequence. In other words, the bitrate code values of the bitrate code parameter of one or more frames may be used to signal the value of the mantissa $f_{brCorr}$, in order to increase the precision of the initial estimate (provided by the interval [$br_{min}$, $br_{max}$])

The mantissa may be determined from bitrate code values of the bitrate code parameter of one or more frames such that the precision of the mantissa $f_{brCorr}$ increases with the number of frames of the subsequence, which comprise a bitrate code parameter corresponding to a bitrate code value. In particular, the precision of the mantissa $f_{brCorr}$ may increase by a factor L with each frame of the subsequence, which comprises a bitrate code parameter corresponding to a bitrate code value. As such, a direct link between the desired precision of the bitrate estimate and the signaling latency and/or overhead may be provided. By doing this, a high degree of flexibility for bitrate signaling is provided.

The subsequence may comprises Q frames q, with q=1, ... , Q, having a bitrate code parameter which corresponds to a bitrate code value, with Q being an integer greater than zero. The parameter Q is also referred in the present document as br_digits. The parameter $c_q$ may be the bitrate code value of frame q, with $c_q \in \{0; 1; \ldots; L-1\}$. The parameter br_corr may be an accumulated bitrate code determined as $\Sigma_{q=1}^{Q} c_q \times L^{Q-q}$. The mantissa $f_{brCorr}$ may then be given by $$f_{brCorr} = 2^{\left(\frac{br\_corr}{L^Q}\right)}.$$

It can be seen that as Q increases, the precision of the mantissa $f_{brCorr}$ increases.

In a preferred example, Q=3, L=3 and N=4. Furthermore, the bitrate code parameter may comprise only two bits, thereby providing a relatively low amount of bitrate signaling overhead.

As indicated above, according to a further aspect, a method for increasing the precision of an initial estimate of the bitrate is described. In other words, a method for determining an estimate $br_{est}$ of the bitrate br of a bitstream or for increasing the precision of the estimate $br_{est}$ of the bitrate br is described. Furthermore, the corresponding bitrate estimator is described. The bitstream comprises a sequence of frames, wherein the frames of the sequence of frames comprise a varying number of bits. The frames of the sequence of frames correspond to excerpts of an audio signal and/or of a video signal. As outlined in the present document, the estimate $br_{est}$ of the bitrate br of the bitstream may be representable in a floating point representation comprising a mantissa $f_{brCorr}$ and an exponent k. At least one frame of the sequence of frames may comprise a bitrate code parameter. The method comprises providing a lower bound $br_{min}$ and an upper bound $br_{max}$ of the bitrate br (as an initial estimate of the bitrate). Furthermore, the method comprises determining the exponent k based on the lower bound $br_{min}$ and/or based on the upper bound $br_{max}$ of the bitrate br. In addition, the method comprises determining the mantissa $f_{brCorr}$ based on the bitrate code parameter of one or more frames of the sequence of frames.

According to a further aspect, a bitrate estimator, comprising e.g. a processor, is described. The bitrate estimator is configured to determine an estimate $br_{est}$ of the bitrate br of a bitstream. The bitstream comprises a sequence of frames, wherein the frames of the sequence of frames may comprise a varying number of bits. The frames of the sequence of frames correspond to excerpts of an audio signal and/or of a video signal. At least two frames of the sequence of frames comprise a wait_frames parameter, wherein the wait_frames parameter of a frame may be indicative of a processing delay for the corresponding frame. The bitrate estimator, notably the processor, may be configured to determine a total number of bits $S_{Tot}$ for a subsequence of frames from the bitstream. Furthermore, the bitrate estimator, notably the processor, may be configured to determine a corrected number N' of frames based on a number of frames comprised within the subsequence and based on the wait_frames parameters of at least two frames of the subsequence. In addition, the bitrate estimator, notably the processor, may be configured to determine a lower bound $br_{min}$ and an upper bound $br_{max}$ of the bitrate br based on the total number of bits $S_{Tot}$, based on the corrected number N' of frames and based on a frame rate $f_{frame}$ of the bitstream.

According to another aspect, a multiplexing device configured to determine a combined bitstream from one or more individual bitstreams is described. The multiplexing device comprises a bitrate estimator as described in the present document, which is configured to determine estimates of the bitrate of the one or more individual bitstreams. The multiplexing device may be configured to determine the combined bitstream based on the estimates of the bitrate of the one or more individual bitstreams. The one or more individual bitstreams which are multiplexed may be elementary streams, and the combined bitstream may be a MPEG-2 transport stream.

According to another aspect, a method for providing a bitstream having a bitrate br is described. The method may comprise generating a sequence of frames from an audio signal and/or from a video signal. The frames of the sequence of frames may correspond to or may be indicative of excerpts of the audio signal and/or of the video signal. In particular, the frames of the sequence of frames may comprise encoded data derived from excerpts of the audio signal and/or of the video signal.

The method may further comprise inserting into at least two frames of the sequence of frames a wait_frames parameter. The wait_frames parameter of a frame may be indicative of a processing delay for the corresponding frame. As outlined above, the wait_frames parameter may be used to provide an initial estimate of the bitrate br.

The method comprises inserting into at least two frames of the sequence of frames a bitrate code parameter. The bitrate code parameter may take on different bitrate code values. The bitrate code values of the inserted bitrate code parameters typically depend on the bitrate br of the bitstream. As outlined in the present document, the bitrate code values of the bitrate code parameter may be used to increase the precision of an initial estimate of the bitrate br. As such, the method provides a bitstream which allows for the determination of a precise estimate of the bitrate br with relatively low signaling overhead.

A bitrate code parameter may only be inserted into a frame which also comprises a wait_frames parameter. In particular, a bitrate code parameter may only be inserted, if the wait_frames parameter indicates that the frames of the sequence of frames comprise a varying number of bits and/or that the bitstream is not a constant bitrate (CBR) bitstream. By doing this, the signaling overhead may be further reduced.

As already outlined above, the bitrate code parameter may comprise only two bits. Alternatively or in addition, the bitrate code parameter may comprise a start code and/or a stop code in addition to two or more bitrate code values. As such, the bitrate signaling may occur in a flexible and overhead efficient manner.

According to another aspect, a bitstream having a bitrate br is described. The bitstream comprises a sequence of frames, wherein the frames of the sequence of frames correspond to excerpts of an audio signal and/or of a video signal. At least two frames of the sequence of frames may comprise a wait_frames parameter, wherein the wait_frames parameter of a frame is indicative of a processing delay for the corresponding frame. Furthermore, at least two frames of the sequence of frames may comprise a bitrate code parameter, wherein the bitrate code parameter takes on different bitrate code values and wherein the bitrate code values of the inserted bitrate code parameters depend on the bitrate br of the bitstream.

According to a further aspect, an encoding system configured to generate a bitstream having a bitrate br is described. The encoding system (e.g. a processor of the encoding system) is configured to generate a sequence of frames from an audio signal and/or from a video signal, wherein the frames of the sequence of frames correspond to excerpts of the audio signal and/or of the video signal. In addition, the encoding system (e.g. a processor of the encoding system) is configured to insert into at least two frames of the sequence of frames a wait_frames parameter, wherein the wait_frames parameter of a frame is indicative of a processing delay for the corresponding frame. Furthermore, the encoding system (e.g. a processor of the encoding system) is configured to insert into at least two frames of the sequence of frames a bitrate code parameter. The bitrate code parameter may take on different bitrate code values. The actual bitrate code values of the inserted bitrate code parameters depend on the bitrate br of the bitstream.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Figure 2:
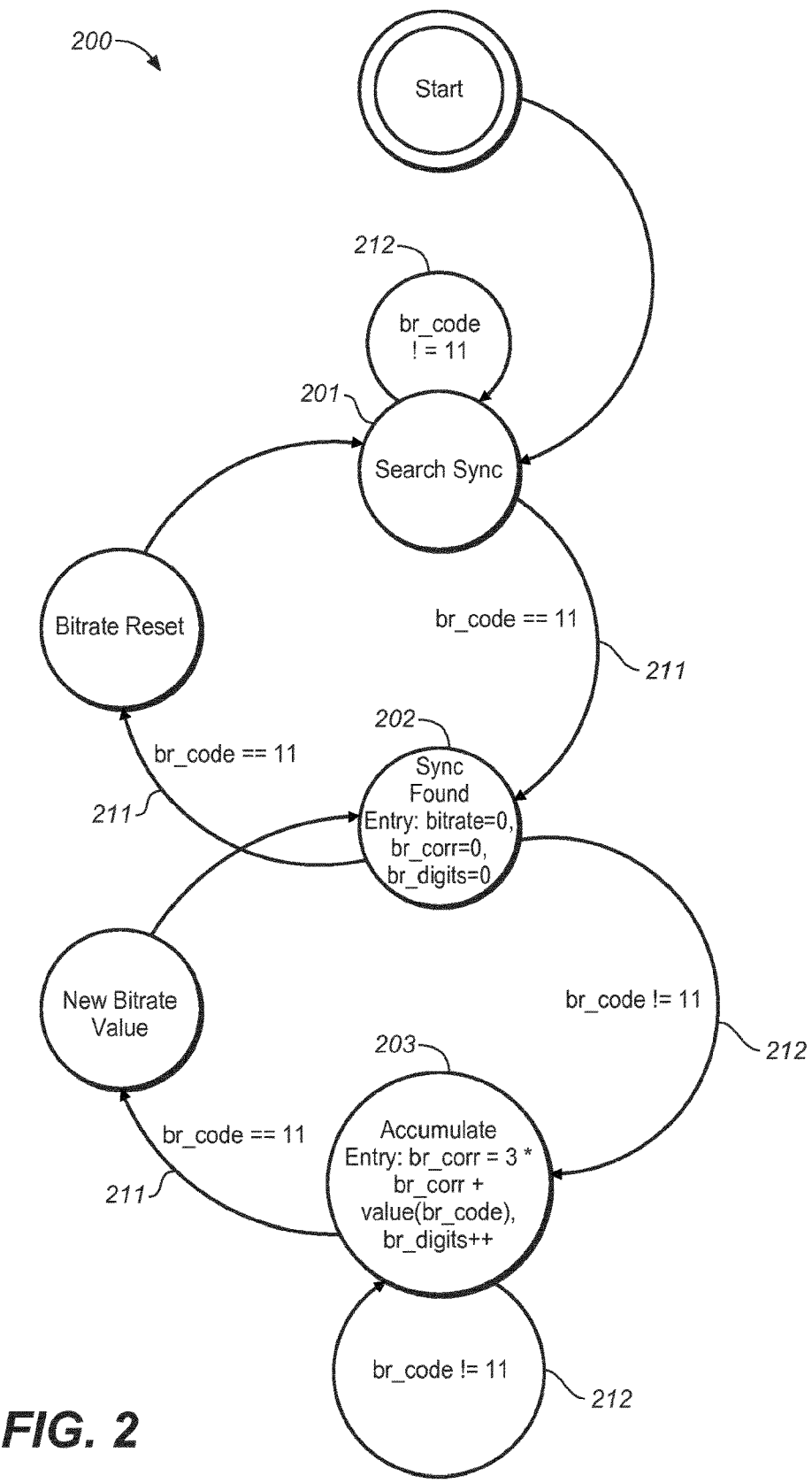

The invention is explained below in an exemplary manner with reference to the accompanying drawings, wherein FIG. 1 shows a block diagram of an example coding and/or transmission system; and FIG. 2 shows an example state machine.

DETAILED DESCRIPTION

As outlined above, the present document relates to the determination of the bitrate of a bitstream. The bitrate may need to be determined e.g. by a multiplexing device, in order to merge the bitstream with one or more other bitstreams. An example of such a multiplexing device is a MPEG-2 Transport Stream (TS) multiplexer. Alternatively or in addition, a decoding device may need to determine the bitrate of a received bitstream in preparation of decoding of the bitstream.

FIG. 1 shows a block diagram of an example coding and/or transmission system 100. The system 100 comprises one or more encoding devices or encoders 101 which are configured to generate respective one or more bitstreams 111. A bitstream 111 may comprise e.g. an encoded audio signal. The bitstream 111 may be structured as a sequence of frames, wherein each frame may be indicative of an excerpt of the encoded audio signal. Each frame of the bitstream 111 may represent an excerpt of a pre-determined (temporal) length of the audio signal (e.g. 20 ms of the audio signal).

The bitstream 111 is provided to a multiplexing device or multiplexer 103. The multiplexing device 103 typically comprises a buffer 102 which is configured to store one or more frames of the bitstream 111 in preparation of the multiplexing task. The multiplexing device 103 may be configured to merge a plurality of bitstreams 111 into a combined bitstream 113. The individual bitstreams 111 may be elementary streams (ES) and the combined bitstream 113 may be a transport stream (TS), e.g. a transport stream in accordance to the MPEG-2 standard (MPEG-2, Part 1).

The combined bitstream 113 may be de-multiplexed by a de-multiplexing device or a de-multiplexer 104 and one or more of the individual bitstreams 111 may be provided to respective one or more decoding devices or decoders 105. A decoding device 105 may be configured to reconstruct an audio signal from an encoded bitstream 111. For this purpose, the decoding device 105 may make use of a buffer 106.

The multiplexing device 103 and/or the decoding device 105 may be configured to determine the bitrate of an individual bitstream 111. For this purpose, the multiplexing device 103 and/or the decoding device 105 may comprise a bitrate estimator or a bitrate estimation unit. The bitrate estimator may make use of one or more of the following information to estimate the bitrate of the bitstream 111 (without the need of additional overhead information comprised within the bitstream 111):

the frame size S, (e.g. the number of bits) of one or more frames n, with n=0, . . . , N, comprised within the bitstream 111 (with N+1 being the number of frames which are considered for estimating the bitrate); and/or the frame rate $f_{frame}$ which indicates e.g. the number of frames per pre-determined time interval (e.g. per second); and/or a state of the buffer 106 and/or an indication regarding the amount of time that the one or more frames n have to be buffered by the buffer 106. In particular, a fill state of the buffer 106 (e.g. a number of frames which are stored within the buffer 106) may be considered. Alternatively or in addition, an indication of the time interval that a frame n needs to be buffered prior to processing may be considered. An indication of the fill state of the buffer 106 and/or of the time interval for buffering is the so-called wait_frames parameter. The wait_frames parameter indicates the time interval or the number of frames that a particular frame has to wait within the buffer 106 prior to being processed. The wait_frames parameter is typically comprised as information with a frame of the bitstream 111.

One or more of the above mentioned parameters may be used by the bitrate estimator to determine an estimate of the bitrate of the bitstream 111. Typically the quality of the estimate increases, as the number N of frames which are considered by the bitrate estimator increases (notably in case of an ABR bitstream 111).

An estimate $br_{Est}$ of the bitrate may be obtained using the following method. For determining the estimate $br_{Est}$, an upper bound $br_{max}$ and a lower bound $br_{min}$ of the actual bitrate br may be determined based on the frame sizes $S_n$ of a plurality of frames, based on the frame rate $f_{frame}$ and based on the values of the wait_frames parameter for at least some of the plurality of frames. Using the bounds $br_{min}$ and $br_{max}$ possible base ranges $V_{Base}(k)$ (e.g. two base ranges) for the value of the actual bitrate br may be determined. The bounds $br_{min}$ and $br_{max}$ and/or the base ranges $V_{Base}(k)$ provide a (more or less) rough indication of the actual bitrate br. This indication may be refined further using bitrate information (e.g. a bitrate code) which is transmitted within the bitstream 111. In particular, a bitrate correction factor may be calculated from a bitrate code which is transmitted within one or more frames of the bitstream 111. The bitrate correction factor may be used in conjunction with the base ranges $V_{Base}(k)$ to determine a plurality of intermediate bitrate estimates $br_x$ (e.g. two bitrate estimates based on two base ranges $V_{Base}(k)$). Subsequently, the correct estimate $be_{Est}$ of the bitrate may be selected from the plurality of intermediate bitrate estimates $br_x$ using the bounds $br_{min}$ and $br_{max}$.

The lower and upper bounds $br_{min}$, $br_{max}$ of the bitrate may be determined by evaluating the frame sizes of a sequence of N+1 frames n, with n=0, ..., N. In particular, the N+1 frames between two adjacent start codes may be analyzed. As will be outlined in further detail below, at least some frames of the bitstream 111 may comprise a bitrate code (referred to herein as the br_code parameter). The bitrate code may have a length of two bits. An example of the meaning of the bit combinations of the bitrate code is provided in Table 1. It can be seen that the bitrate code may correspond to a start code (bit combination 11b).

TABLE 1

| br_code | semantics |
|---|---|
| 00b | value(br_code) = 0 |
| 01b | value(br_code) = 1 |
| 10b | value(br_code) = 2 |
| 11b | Bitrate Start Code |

The N+1 frames which are considered for determining the lower and upper bounds $br_{min}$, $br_{max}$ of the bitrate may correspond to a subsequence from a sequence of frames of the bitstream 111, wherein only the first and the last frame of the subsequence comprise the start code. Hence, the first frame in this subsequence of N+1 frames (i.e. n=0) carries a first start code. It is followed by N−1 frames carrying bitrate codes other than the start code (or carrying no bitrate code at all). The Nth frame of the subsequence carries a second start code.

TABLE 2

| Syntax | No. of bits |
|---|---|
| ac4_toc( ) | |
| { | |
|    bitstream_version | 2 |
|    if (bitstream_version == 3) { | |
|       bitstream_version += variable_bits(2) | var |
|    } | |
|    sequence_counter | 10 |
|    if (b_wait_frames) { | 1 |
|       wait_frames | 3 |
|       if (wait_frames > 0) { | |
|          br_code | 2 |
|       } | |
|    } | |
|    fs_index | 1 |
|    frame_rate_index | 4 |
|    b_iframe_global | 1 |
|    presentations_bits | 1 |
|    if (presentations_bits ==1) {/* single stream */ | |
|       n_presentations =1 | |
|    } else { | |
|       if (b_more_presentations ==1) { | 1 |
|          n_presentations = variableBits(2)+2 | var |
|       } else { | |
|          n_presentations=0 | |
|       } | |
|    } | |
|    payload_base=0 | |
|    if (b_payload_base) { | 1 |
|       payload_base = 1+ payload_base_bits | 5 |
|       if (payload_base == 0x20) { | |
|          payload_base += variableBits(3) | var |
|       } | |
|    } | |
|    for (i=0; i<n_presentations; i++) { | |
|       ac4_presentation_info[i] | |
|    } | |
|    substream_index_table( ) | |
|    byte_align [TOC | |
| } | |

Table 2 shows an example syntax of a frame of the bitstream 111. It can be seen that a frame comprises information regarding the wait_frames parameter. The wait_frames parameter may be used by the buffer 106 to queue the corresponding frame. In particular, the wait_frames parameter may indicate to the buffer 106 a number of frames which the corresponding frame has to be buffered prior to being processed by a subsequent device (e.g. by the decoding device 105). Also the multiplexing device 103 may make use of the wait_frames parameter to determine the number of frames which are to be buffered before inserting the frames into the multiplexed bitstream 113. However, for use in a transmitting device (e.g. in the multiplexing device 103) the wait_frames parameter may need to be converted. This is due to the fact that the buffer 102 in a transmitting device 103 typically operates opposite to the buffer 106 in a receiving device 105, in order to even out the varying frame sizes.

In case of a frame having a relatively large size (compared to the average size of a frame), the wait_frames parameter may be reduced, in order to ensure that a frame is not processed too late. On the other hand, in case of a frame having a relatively short size (compared to the average size of a frame), the wait_frames parameter may be increased, in order to ensure that a frame is not processed too early.

In order to determine the bounds $br_{min}$, $br_{max}$, the size $S_n$ of the frames n in a subsequence of N+1 frames may be accumulated to determine a total size $S_{Tot}=\Sigma_{n=1}^{N}S_n$. The size $S_n$ of the first frame in the subsequence (i.e. n=0) is typically ignored, notably if the wait_frames parameter of a frame refer to a point in time when the end of the corresponding frame is received. Alternatively, the size $S_n$ of the last frame in the subsequence (i.e. n=N) may be ignored, e.g. if the wait_frames parameter of a corresponding frame refers to a point in time when the beginning of the frame is received.

Furthermore, a corrected number of frames N' may be determined by evaluating the wait_frames parameter of at least some of the frames of the subsequence of frames. The corrected number of frames N' may be given by N'=N+wait_frames(0)−wait_frames(N), wherein wait_frames(0) is the value of the wait_frames parameter of the first frame (n=0) of the subsequence and wherein wait_frames(N) is the value of the wait_frames parameter of the last frame (n=N) of the subsequence. As outlined above, the wait_frames(n) parameter of a frame n tends to reduce (compared to the wait_frames(n) parameter of the previous frame n−1, if the size $S_n$ of the frame n is higher than the average frame size $$\frac{br}{f_{frame}}$$

(which corresponds to the actual bitrate br), and vice versa. Hence, a difference [wait_frames(0)−wait_frames(N)]>0 indicates that the average size of the frames of the subsequence has been higher than the average frame size $$\frac{br}{f_{frame}}$$

(and therefore corresponds to a higher number of frames (in average)). In a similar manner, a difference [wait_frames(0)−wait_frames(N)]<0 indicates that the average size of the frames of the subsequence has been lower than the average frame size $$\frac{br}{f_{frame}}$$

(and therefore corresponds to a lower number of frames (in average)). The amount of the difference [wait_frames(0)−wait_frames(N)] indicates by how much (expressed in a number of frames), the average size of the frames of the subsequence has been higher or lower than the average frame size $$\frac{br}{f_{frame}}.$$

As such, the corrected number of frames N' provides an indication of the number of frames that the determined total size $S_{Tot}$ of the subsequence of frames would correspond to, if each frame n, n=1, . . . , N, had the average frame size $$\frac{br}{f_{frame}}.$$

The wait_frames(n) parameters typically have a predetermined resolution. As shown in the example of Table 2, the wait_frames(n) parameter of a frame comprises a total of 3 bits and can therefore take on 8 different values. Typically the wait_frames(n) parameter indicates the delay for the processing of a frame as an integer multiple of a frame. Hence, the corrected number of frames N' may differ by one frame (i.e. N'−1 or N'+1) from the number of frames that the determined total size $S_{Tot}$ of the subsequence of frames would correspond to, if each frame n, n=1, . . . , N, had the average frame size $$\frac{br}{f_{frame}}.$$

Hence, a lower bound and an upper bound of the actual bitrate br may be determined using $S_{Tot}$, N', and the frame rate $f_{frame}$ using the following formula:

$$br_{max} = \frac{S_{Tot}}{(N'-1)} \times f_{frame},$$

$$br_{min} = \frac{S_{Tot}}{(N'+1)} \times f_{frame}.$$

The actual bitrate br, i.e. the average bitrate of an ABR bitstream 111, lies in between the lower boundary and the upper boundary, i.e. $br_{min}<br<br_{max}$.

It should be noted that frames which comprise bitrate information, notably frames which comprise bitrate codes, must not necessarily appear subsequently within a bitstream. As illustrated in Table 2, the bitstream format allows sending of a wait_frames parameter and hence of a br_code parameter on a frame-by-frame basis. If the overhead which is caused by the transmission of the br_code parameter is a sensitive factor, the bitrate information may be sent only every $2^{nd}$ or $3^{rd}$ frame. Nevertheless, all frames within a subsequence between two adjacent start codes may be used to determine the upper and lower bounds of the actual bitrate br, as outlined above.

Hence, it may be determined that the actual bitrate br lies within the interval [$br_{min}$,$br_{max}$]. This interval provides a (more or less) rough estimate $br_{est}$ of the actual bitrate br. As will be outlined below, the br_code parameter may be used to refine this (more or less rough) estimate $br_{est}$ of the actual bitrate br. In particular, the br_code parameter may be used to refine the estimate $br_{est}$ on a frame-by-frame basis. For this purpose, a floating point representation of the actual bitrate br may be used. Such a floating point representation comprises an exponent k (e.g. an exponent to the basis 2) and a mantissa $f_{brCorr}$. The exponent k may be determined based on the bounds $br_{min}$, $br_{max}$ and/or the mantissa $f_{brCorr}$ may be determined using the br_code parameter comprised within one or more frames of the bitstream 111.

The mantissa $f_{brCorr}$ (also referred to herein as the bitrate correction factor) may be defined to take on values within the interval [1,2), and the exponent k may be an exponent to the basis 2, such that the estimate of the actual bitrate may be given by $$br_{est}=f_{brCorr}\times 2^k.$$

In the following, methods for determining the exponent k and for determining the mantissa $f_{brCorr}$ are described.

The actual bitrate may take on the following values $br_{min}<br<br_{max}$. As can be seen from the formulas for the lower and upper bound, the width of the interval $[br_{min}, br_{max}]$ typically decreases with an increasing number N of frames which are considered. In particular, the difference $\Delta = (br_{max} - br_{min})$ is given by:

$$\Delta = (br_{max} - br_{min}) = \frac{S_{Tot}}{(N'-1)} \times f_{frame} - \frac{S_{Tot}}{(N'+1)} \times f_{frame} = \frac{2 \times S_{Tot} \times f_{frame}}{(N'-1)(N'+1)}.$$

It can be shown that in the worst case (e.g. for N=2 or 3 frames), the interval $[br_{min}, br_{max}]$ comprises two of the following base ranges:

$$V_{Base}(k) = [2^k \text{ kbit/s}, 2^{(k+1)} \text{ kbit/s}[$$

for two adjacent integer values of k (referred to herein as $K_1$ and $K_2$ with $K_2 = K_1 + 1$).

Hence, two base ranges $V_{Base}(K_1)$ and $V_{Base}(K_2)$ may be determined based on at least one of the bounds $br_{min}, br_{max}$. In particular, the two base ranges may be determined such that the following conditions are fulfilled:

$$br_{min} \in V_{Base}(K_1)$$

$$K_2 = K_1 + 1.$$

An alternative way of determining $K_1$ and $K_2$ is given by $$K_1 = \lfloor \log_2(br_{min}) \rfloor$$

$$K_2 = K_1 + 1.$$

Both methods provide the same base ranges, i.e. the same exponents $K_1$ and $K_2$.

The mantissa or bitrate correction factor $f_{brCorr}$ may be determined using one or more bitrate codes (i.e. br_code parameters) comprised within one or more frames of the bitstream 111. As indicated in Table 1, the br_code parameter of a frame may take on three different values, i.e. 0, 1, 2. From the values of the br_code parameters of a subsequence of one or more frames, a so called br_corr value may be determined. The bitrate correction factor $f_{brCorr}$ may then be calculated based on the br_corr value of the subsequence of one or more frames.

In particular, the br_corr value may be determined based on the values of the br_code parameters comprised within the frames of the above mentioned subsequence, wherein the first and last frame of the subsequence comprise br_code parameters corresponding to the start code and wherein, apart from the first and the last frame, the subsequence comprises no further frame with a start code.

The br_corr value of such a subsequence may be determined by interpreting the values of the br_code parameter of a single frame as digits of a number of the base 3, MSB first. By way of example, the subsequence of frames may comprise the following sequence of values for the br_code parameters: 11 01 10 00 11, which represents the code 01 10 00 encapsulated in between two start codes. The code represents the br_corr value of $1*3^2 + 2*3^1 + 0*3^0 = 15$.

The bitrate correction factor may be calculated according to the following formula:

$$f_{brCorr} = 2^{\left(\frac{br\_corr}{3^{br\_digits}}\right)},$$

wherein br_digits denotes the number of br_code parameters, which have been sent between two adjacent bitrate start codes.

For the example above, this results in:

$$f_{brCorr} = 2^{\left(\frac{15}{3^{(3)}}\right)} = 2^{\left(\frac{15}{27}\right)} = 1.46973 \ldots$$

Alternatively or in addition, the bitrate correction factor $f_{brCorr}$ may be determined in an iterative manner, i.e. on a frame-by-frame basis. Subsequent to receiving a frame n (e.g. n=0) comprising a first start code, a frame i (e.g. i=1) comprising a br_code parameter having a value which is different from the start code may be identified. The parameter i counts the number of frames which comprise a br_code parameter having a value which is different from the start code. Hence, the parameter i starts at 1 and goes up to br_digits. Using the br_code parameter of frame i an intermediate bitrate correction factor $f_{brCorr}(i)$ may be determined in a recursive manner as $$f_{brCorr}(i) = 2^{\frac{br\_code(i)}{3^i}} \times f_{brCorr}(i-1),$$

wherein $f_{brCorr}(0) = 1$ and wherein br_code(i) denotes the value of the br_code parameter of frame i. Using the above recursive formula, the intermediate bitrate correction factor $f_{brCorr}(i)$ may be refined with each frame comprising a br_code parameter having a value which is different from the start code. As soon as a frame comprising a second start code is received, the intermediate bitrate correction factor $f_{brCorr}(i)$ may be set to be the bitrate correction factor $f_{brCorr}$. As such, the bitrate correction factor $f_{brCorr}$ may be refined on a frame-by-frame basis.

The state diagram 200 of FIG. 2 illustrates how the br_corr and br_digits values may be accumulated in an iterative manner. The state diagram or state machine 200 comprises an initial state 201, within which the presence of a frame comprising a br_code parameter which corresponds to a start code (i.e. in the illustrated example a br_code parameter having the value 11b) is monitored. If a frame with a br_code parameter other than the start code is detected (transition 212), the state machine 200 remains within the initial state 201. On the other hand, if a frame with a br_code parameter which corresponds to the start code (transition 211) is detected, the state machine 200 moves to the initialization state 202. Within the initialization state 202, the parameters br_digits and br_corr may be set to zero.

Upon detection of a subsequent frame with a br_code parameter which corresponds to the start code (transition 211), the current estimate of the bitrate may be reset. Upon detection of a subsequent frame with a br_code parameter which corresponds to a value other than the start code (transition 212), the accumulation of the parameters br_digits and br_corr may occur in the accumulation state 203. The accumulation/determination of the parameters br_digits and br_corr may proceed as long as frames with a br_code parameter which corresponds to a value other than the start code (transition 212) are received. As such, the parameters br_digits and br_corr may be updated on a frame-by-frame basis, thereby providing more precise values for the bitrate correction factor $f_{brCorr}$ (using the above formulas).

The detection of a new start code (transition 211) may indicate that a new bitrate value is to be determined. The parameters br_digits and br_corr may then be reset in the initialization state 202.

As illustrated in FIG. 2, if two or more consecutive bitrate start codes are received, the bitrate calculation may be reset. Consecutive bitrate start codes may be used to explicitly signal that the encoder 101 of the bitstream 111 modifies the bitrate (e.g. the ABR bitrate).

It should be noted that a change of a program (e.g. of an audio signal) which is carried within a bitstream 111 may cause a reset of the accumulation process in the accumulation state 203 and a reset to state 201 or state 202.

As outlined above, the bitrate correction factor $f_{brCorr}$ may be decoded sequentially as the frames and/or the values of the br_code parameter are received. An additional digit, i.e. an additional value of a br_code parameter, improves the precision of the bitrate correction factor $f_{brCorr}$ by a factor 3.

The estimate $br_{Est}$ may be determined based on the bitrate correction factor $f_{brCorr}$ (i.e. based on the mantissa) and based on at least one of the exponents $K_1$ and $K_2$. In particular, two intermediate estimates $br_1$ and $br_2$ of the bitrate may be calculated for $K_1$ and $K_2$, respectively, using $$br_x = f_{brCorr} \times 2^{K_x} kbit/s = 2^{\left(\frac{br\_corr}{3^{br\_digits}} + K_x\right)} kbit/s, \text{ for } x \in \{1; 2\}.$$

The correct estimate (i.e. either $br_1$ or $br_2$) may be determined by comparing the estimates $br_1$ and $br_2$ with the lower and upper bounds, $br_{min}$ and $br_{max}$, respectively. The bitrate estimate that fulfills the following condition corresponds to the estimated bitrate $br_{Est} = br_x$:

$$br_{min} < br_x < br_{max} \text{ for } x \in \{1; 2\}.$$

If there is no $br_x$ that fulfills the above condition, this means that the bitrate estimate which is given by the interval $[br_{min}, br_{max}]$ is more exact than an estimate which can be determined based on the bitrate correction factor. In such a case, the actual bitrate br lies within the range $[br_{min}, br_{max}]$. A typical bitrate value (e.g. a rounded bitrate value) may be selected from the range $[br_{min}, br_{max}]$ as the estimated bitrate $br_{Est}$. Alternatively the estimate of the bitrate may be determined as the geometric mean of $br_{min}$ and $br_{max}$ or if an upper estimate of the bitrate is needed $br_{max}$ may be taken as the estimated bitrate $br_{Est}$.

In a preferred embodiment, 3 br_digits (i.e. three frames) may be used to specify the bitrate (notably to specify the bitrate correction factor $f_{brCorr}$). Hence, including the frames with the start code, the bitrate calculations may be based on a total of 5 frames. In a first step, the upper and lower bounds are determined. The selection of bitrate base ranges is typically only unique, if the bound fulfill the following condition: $br_{max} < 2 \cdot br_{min} \rightarrow br_{max}/br_{min} <= 2$. From the above formulas, it is found that $$\frac{br_{max}}{br_{min}} = \frac{\frac{S_{Tot}}{(N'-1)} \times f_{frame}}{\frac{S_{Tot}}{(N'+1)} \times f_{frame}} = \frac{N'+1}{N'-1}.$$

For N=5, the above—on average—results in 3/2 (which is smaller than 2, and lies in the range of [1, 2]). Using 3 digits provides 27 "steps" in each bitrate base range. A single step corresponds to $2^{(1/27)} = 1.027$. Hence, the accuracy of the bitrate estimate using the method described in the present document (for five frames) is expected to be around 3%.

As outlined above, (at least) two base ranges $V_{Base}(k)$ may be determined based on the bounds $br_{min}$ and $br_{max}$. Notably for actual bitrates br which correspond to or which are close to a limit of one of the base ranges, i.e. $2^k$ kbit/s, e.g. 128 kbps, the bounds $br_{min}$ and $br_{max}$ may lead to varying base ranges. In one frame the bounds $br_{min}$ and $br_{max}$ may result in the [64,128[ base range and in a next frame in the [128,256[ base range. By determining (at least) two base ranges $V_{Base}(k)$ for each subsequence of frames, it is ensured that at least one base range is determined which provides the correct bitrate estimate. Furthermore, this allows the bitrate correction factor to remain stable over time (ideally $f_{brCorr} = 0$ in the above example). Then only the [128,256[ base range will place the bitrate between the upper and lower bounds $br_{min}$ and $br_{max}$. Using such a logic allows the encoder 101 to send constant correction factors $f_{brCorr}$ that do not refer to the actual frame sizes used.

The bitrate code (i.e. the br_code parameter) shown in the syntax of Table 2 may also be used for a VBR bitstream 111. As outlined above, a br_corr parameter may be determined from one or more values of the br_code parameters of one or more frames. The br_corr parameter may then be used in conjunction with Table 3 to determine the bitrate of the VBR bitstream 111. Hence, even in the case of a VBR bitstream 111, the described br_code parameter may be used to provide an estimate of the bitrate of the bitstream 111.

TABLE 3

| br_corr | VBR Bitrate | Calculation |
|---|---|---|
| 0 | 16 kbps | = $2^0$ * (16) |
| 1 | 20 kbps | = $2^0$ * (16 + 4) |
| 2 | 24 kbps | = $2^0$ * (16 + 8) |
| 3 | 28 kbps | = $2^0$ * (16 + 12) |
| 4 | 32 kbps | = $2^1$ * (16) |
| 5 | 40 kbps | = $2^1$ * (16 + 4) |
| 6 | 48 kbps | = $2^1$ * (16 + 8) |
| 7 | 56 kbps | = $2^1$ * (16 + 12) |
| 8 | 64 kbps | = $2^2$ * (16) |
| 9 | 80 kbps | = $2^2$ * (16 + 4) |
| 10 | 96 kbps | = $2^2$ * (16 + 8) |
| 11 | 112 kbps | = $2^2$ * (16 + 12) |
| 12 | 128 kbps | = $2^3$ * (16) |
| 13 | 160 kbps | = $2^3$ * (16 + 4) |
| 14 | 192 kbps | = $2^3$ * (16 + 8) |
| 15 | 224 kbps | = $2^3$ * (16 + 12) |
| 16 | 256 kbps | = $2^4$ * (16) |
| Etc. | | |

As such, it is proposed herein to use the frame sizes and the wait_frames parameter of a sequence of frames for estimating an initial bitrate range of an ABR bitstream. The calculation may be refined further by sending additional two bits (as the bitrate code parameter). The bitrate code parameter may be appended to the frames comprising a wait_frames parameter, in order to signal more precise information regarding the bitrate. For Constant Bitrate (CBR, typically with wait_frames=0) bitstreams, additional signaling is typically not required, because all frames have the same size (+/− one byte). For Variable Bitrate (VBR, typically with wait_frames=7) bitstreams, the two bits of the bitrate code parameter may be used to signal an absolute target or average bitrate for informational purposes (as outlined in the context of Table 3).

Hence, in the present document, a method for signaling and/or for estimating the bitrate of a bitstream has been described. The described method allows for a precise determination of the bitrate, using only a limited amount of overhead data within the bitstream. Furthermore, the described method allows the estimation of the bitrate in an iterative or sequential manner. Notably the accuracy of the bitrate estimate may be increased in a flexible manner (e.g. on a frame-by-frame basis).

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

Further aspects of the present document are described below:

It is suggested in the present document to reserve a pre-determined number of bits in the bitstream for signaling bitrate information. As those reserved bits will typically increase metadata load, the number should be chosen to be relatively small, e.g. in the range of [2, 8], preferably [2, 4] and most preferably 2.

A small number of said reserved bits may not be capable of encoding the applied bitrate for lack of numeric range such limited (small) number of bits can encode, the present document therefore suggests to distribute bitrate signaling over a number of subsequent frames.

Furthermore, the present document makes provision for indirect coding of the bitrate such that the values of said pre-determined number of bits over said number of subsequent frames decodes into a significance of said bits, depending of the position of a current frame within said number of subsequent frames. This will further reduce bit demand for encoding/signaling the bitrate. In addition, the document describes the usage of a combination of measurement and signaling for determining an estimate of the bitrate. By doing this, the number of bits which are required to signal a bitrate with a precision that goes beyond the measurable accuracy can be reduced.

The number of subsequent frames is e.g. the number of frames received after a preceding frame is detected having a start signal encoded in the pre-determined number of bits of said preceding frame, and before a closing frame is detected having a stop signal encoded in the pre-determined number of bits of said closing frame. Said preceding and conclusive frames thus provide a bracket for said number of frames.

According to an aspect, a method of signaling a bitrate in a bitstream is suggested, the bitstream comprising a plurality of frames and a pre-determined number of bits to facilitate the bitrate signaling, the method comprising:
  transmitting, in a first frame, a bitrate start code via said pre-determined number of bits;
  receiving subsequent frames and buffering the values of said pre-determined number of bits of each subsequent frame;
  transmitting, in a second frame, the second frame succeeding said subsequent frames, a bitrate stop code via said pre-determined number of bits; and
  calculating an estimate of the bitrate using the buffered values of said pre-determined number of bits included in said subsequent frames.

In a preferred example, the bitrate start code and the bitrate stop code are identical, e.g. "11" in a two-bit format.

Instead of directly encoding said bitrate estimate and distributing the encoded bitrate over the number of subsequent frames, said values of said pre-determined number of bits of all subsequent frames can represent a position of a discrete bitrate value as encoded in a pre-determined table of discrete bitrate values. In this example, the values of said pre-determined number of bits over all subsequent values encode a position of a fixed discrete bitrate as encoded in a pre-determined table. This saves on the bit requirement.

In the latter example, a roughly logarithmic scale, e.g. $br \sim 2^{(x/k)} * br\_min$—with k being a constant that defines the number of steps between factor of 2 of bitrates—can e.g. be suggested to code the bitrate. x is the numerical value of the code transmitted in the bitstream (via the pre-defined number of bits). Ideally, the bitrates are rounded to the next available step (according to the available resolution). This yields reasonable results for e.g. k=4 and provides for discrete pre-determined bitrate values which can be attributed discrete positions e.g. in a table: 16, 20, 24, 28, 32, 40, 48, 56, 64, 80, 96, 112, 128, 160, 192, etc. E.g. "16" can be assigned position "0" in such table; "20" can be assigned position "1" in such table; "24" can be assigned position "2" in such table; "28" can be assigned position "3" in such table; Etc.

Instead of directly coding the bitrate, one can code the position of the discrete bitrate value, thus saving on required bits.

In various examples, the number of bits which are reserved for signaling the bitrate, will determine the number of subsequent frames which are necessary to decode the bitrate estimate. Good results have been achieved with using two bits for bitrate signaling, where 5 frames may be used to decode the bitrate.

Using the exemplary table above, in order to signal e.g. 160 kbps, which is position 13 in the table, one may need to transmit 13 (indicating the position of 160 kbps in the table!)=1*9+1*3+1*1=>11 01 01 01 11, with "11" being the start and stop code. Three "symbols" are transmitted in between the start and stop code: "01"->"01"->"01". Consequently, after 5 frames (including the start and stop code frames), one obtains the complete result—wherein the actual bitrate position is encoded in the frames transmitted in between the frames having the start and stop codes.

Alternatively, and instead of using a pre-defined coding table approach as outlined before, calculating the estimate of the bitrate can include calculating a first bitrate estimate using the actual sizes of received frames, and calculating a bitrate correction factor based on said values of said pre-determined number of bits of all subsequent frames, wherein the bitrate correction factor may be applied to the first bitrate estimate to yield the estimate of the bitrate. In this example, the pre-determined number of bits encodes—distributed over the number of subsequent frames—a correction factor instead of directly or indirectly encoding the bitrate. Here, the bitrate is roughly estimated in a first step from the actual sizes of received frames while, in a second step, applying the correction factor as encoded in said pre-determined number of bits of the subsequent frames.

Said bitrate correction factor may e.g. be calculated according to:

$$f_{brCorr} = 2^{\left(\frac{br\_corr}{3^{br\_digits}}\right)}$$

wherein $br_{corr}$ is derived from said values of said pre-determined number of bits of all subsequent frames, $br_{digits}$ denotes the number of subsequent frames received, and said pre-determined number of bits is two.

The base denominator in the exponent of the suggested bitrate correction factor can also be chosen different from "3". Here, it is chosen such that the bitrate correction factor will yield a value in the range of [1, 2].

More generally, said bitrate correction factor may e.g. be calculated according to:

$$f_{brCorr} = 2^{\left(\frac{br\_corr}{(2^{(br\_bits)}-1)^{br\_digits}}\right)}$$

wherein $br\_corr$ is derived from said values of said pre-determined number of bits of all subsequent frames, $br\_digits$ denotes the number of subsequent frames received, and $br\_bits$ is said predetermined number of bits.

Also, the base denominator in the exponent of the suggested bitrate correction factor can be chosen different from "$(2^{br\_bits}-1)^{br\_digits}$", (see above). Here, it is chosen such that two bits are used for signaling (br_bits=2) and the bitrate correction factor will yield a value in the range of [1, 2].

In the latter examples, calculating the first bitrate estimate may include calculating an upper and a lower bound for said first bitrate estimate based on said actual frame sizes, wherein calculating the upper and lower bounds can be further refined using received values representing frame rate and frame buffer filling level related to the received frames.

In a further improvement of the example as recited above, first and second base ranges are determined for said first bitrate estimate using the following equation:

$$V_{Base}(k) = [2^k \text{ kbit/s}, 2^{(k+1)} \text{ kbit/s}[$$

wherein the first and second base ranges ($V_{Base}(K_1)$ and $V_{Base}(K_2)$) are those fulfilling the following conditions: $br_{min} \in V_{Base}(K_1)$, and $K_2 = K_1 + 1$, wherein $br_{min}$ represents said lower bound, wherein calculating the estimate of the bitrate preferably also includes:
  a first step of applying the bitrate correction factor to said first base range;
  a second step of applying the bitrate correction factor to said second base range; and
  determining the first result or the second step result to yield the estimate of the bitrate.

In such an example, the first step result may yield the estimate of the bitrate if the bitrate correction factor applied to said first base range lies between said upper and lower bounds, and the second step result may yield the estimate of the bitrate if the bitrate correction factor applied to said second base range lies between said upper and lower bounds.

To facilitate any method described herein, a bitstream format is described, wherein the bitstream format comprises a pre-determined number of bits for encoding a bitrate related to the bitstream, wherein said pre-determined number of bits partially reflects the bitrate such that all values of said pre-determined number of bits of a number of subsequent frames yield the bitrate.

Preferably, the number of subsequent frames is determined from a start bitrate code and a stop bitrate code encoded in the pre-determined number of bits of the number of subsequent frames.

Similar to encoding a number having a number of digits in a number system, a position of a frame in the sequence of the subsequent frames may be related to a significance of the pre-determined number of bits included in said frame.

A further example may also include sending a "start code" and a "stop code" in the pre-determined number of bits two directly subsequent frames ("11"->"11"), e.g. for explicitly re-setting the bitrate decoding, for example when a different bitrate shall be determined after a different bitstream (e.g. related to "ad insertion" or a program change) is received.

Particular enumerated aspects of the present document are:

Aspect 1. A method of signaling a bitrate in a bitstream, the bitstream comprising of a plurality of frames and a pre-determined number of bits to facilitate the bitrate signaling, the method comprising:
  transmitting, in a first frame, a bitrate start code via said pre-determined number of bits;
  receiving subsequent frames and buffering the values of said pre-determined number of bits of each subsequent frame;
  transmitting, in a second frame, the second frame succeeding said subsequent frames, a bitrate stop code via said pre-determined number of bits; and
  calculating an estimate of the bitrate using the buffered values of said pre-determined number of bits included in said subsequent frames.

Aspect 2. The method of aspect 1, wherein the bitrate start code and the bitrate stop code are identical.

Aspect 3. The method of aspect 1, wherein said values of said pre-determined number of bits of all subsequent frames represent a position of a discrete bitrate value as encoded in a pre-determined table of discrete bitrate values.

Aspect 4. The method of aspect 1, wherein
calculating the estimate of the bitrate includes:
  calculating a first bitrate estimate using the actual sizes of received frames, and
  calculating a bitrate correction factor based on said values of said pre-determined number of bits of all subsequent frames, wherein the bitrate correction factor is applied to the first bitrate estimate to yield the estimate of the bitrate.

Aspect 5. The method of aspect 4, wherein calculating the first bitrate estimate includes calculating an upper and a lower bound for said first bitrate estimate based on said actual frame sizes.

Aspect 6. The method of aspect 5, wherein calculating the upper and lower bounds is further based on received values representing frame rate and frame buffer filling level.

Aspect 7. The method according to aspect 5, further comprising determining first and second base ranges for said first bitrate estimate using the following equation:

$$V_{Base}(k) = [2^k \text{ kbit/s}, 2^{(k+1)} \text{ kbit/s}[$$

wherein the first and second base ranges ($V_{Base}(K_1)$ and $V_{Base}(K_2)$) are those fulfilling the following conditions:

$br_{min} \in V_{Base}(K_1)$, and $K_2 = K_1 + 1$, wherein $br_{min}$ represents said lower bound.

Aspect 8. The method according to aspect 7, wherein the estimate of the bitrate includes:
  a first step of applying the bitrate correction factor to said first base range;
  a second step of applying the bitrate correction factor to said second base range; and
  determining the first step result or the second step result to yield the estimate of the bitrate.

Aspect 9. The method of aspect 8, wherein the first step result yields the estimate of the bitrate if the bitrate correction factor applied to said first base range lies between said upper and lower bounds.

Aspect 10. The method of aspect 8, wherein the second step result yields the estimate of the bitrate if the bitrate correction factor applied to said second base range lies between said upper and lower bounds.

Aspect 11. The method of aspect 4, wherein said bitrate correction factor is calculated according to:

$$f_{brCorr} = 2^{\left(\frac{br\_corr}{3^{br\_digits}}\right)}$$

wherein
$br_{corr}$ is derived from said values of said pre-determined number of bits of all subsequent frames, $br_{digits}$ denotes the number of subsequent frames received, and said pre-determined number of bits is two.

Aspect 12. The method according to aspect 2, wherein said pre-determined number of bits is two, and the bitrate start code and the bit rate stop code are "11".

Aspect 13. A bitstream format comprising a pre-determined number of bits for encoding a bitrate related to the bitstream, wherein said pre-determined number of bits partially reflects the bitrate such that all values of said pre-determined number of bits of a number of subsequent frames yield the bitrate.

Aspect 14. The bitstream format of aspect 13, wherein the number of subsequent frames is determined from a start bitrate code and a stop bitrate code encoded in the pre-determined number of bits.

Aspect 15. The bitstream format of aspect 13, wherein a position of a frame in the sequence of the subsequent frames is related to a significance of the pre-determined number of bits included in said frame.

What is claimed is:

1. A method, performed by an audio and/or video signal processing device, for processing a bitstream; wherein the bitstream comprises a sequence of encoded frames; wherein the frames of the sequence of encoded frames comprise a varying number of bits; wherein the frames of the sequence of encoded frames correspond to excerpts of an audio and/or video signal, wherein the excerpts have a constant temporal length; wherein at least two frames of the sequence of encoded frames comprise a wait_frames parameter; wherein the wait_frames parameter of a frame is indicative of a number of frames and/or a time interval that the corresponding frame is to be delayed in a buffer of the audio and/or video signal processing device prior to processing of the frame by the audio and/or video signal processing device; the method comprising determining a total number of bits $S_{Tot}$ for N frames of a subsequence of encoded frames from the bitstream;
determining a corrected number N' of frames based on the number N of frames and based on a difference between the wait_frames parameters of a first frame and a second frame of the subsequence; wherein the first frame corresponds to the frame at a beginning of the subsequence; and wherein the second frame corresponds to the frame at an end of the subsequence;
determining a lower bitrate bound $br_{min}$ and an upper bitrate bound $br_{max}$ of a bitrate br of the bitstream based on the total number of bits $S_{Tot}$, based on the corrected number N' of frames and based on a frame rate $f_{frame}$ of the bitstream;
determining an estimate $br_{est}$ of a bitrate br of the bitstream from the lower bitrate bound and an upper bitrate bound;
storing frames of the sequence of encoded frames in the buffer of the audio and/or video signal processing device;
processing the frames of the sequence of encoded frames, wherein processing the frames of the sequence of encoded frames comprises inserting the encoded frames into a multiplexed bitstream or decoding the sequence of encoded frames; and
outputting, from the audio and/or video signal processing device, the multiplexed bitstream or the decoded frames;
wherein one or more of determining a total number of bits, determining a number N' of frames, determining a lower bitrate bound $br_{min}$ and an upper bitrate bound $br_{max}$, determining an estimate of the bitrate, storing frames of the sequence, processing the frames of the sequence, and outputting the multiplexed bitstream or the decoded frames is implemented, at least in part, by one or more hardware elements of the audio and/or video signal processing device.

2. The method of claim 1, wherein
the lower bitrate bound $br_{min}$ is determined based on the corrected number N' plus 1;
the upper bitrate bound $br_{max}$ is determined based on the corrected number N' minus 1.

3. The method of claim 1, wherein
the subsequence of frames comprises N+1 frames n, with n=0, . . . , N;
the frame n =0 at the beginning of the subsequence comprises a wait_frames parameter, referred to as wait_frames(0);
the frame n =N at the end of the subsequence comprises a wait_frames parameter, referred to as wait_frames (N); and
the corrected number N' of frames is determined by offsetting N using a difference between wait_frames(0) and wait_frames(N).

4. The method of claim 3, wherein the corrected number N' of frames is determined as N'=N+wait_frames(0)−wait_frames(N).

5. The method of claim 3, wherein
the wait_frames parameter of a frame is indicative of a processing delay relative to an end of the corresponding frame;
the total number of bits $S_{Tot}$ is determined as $S_{Tot}=\Sigma_{n=1}^{N}S_n$; and
$S_n$ is the number of bits of frame n of the subsequence.

6. The method of claim 1, wherein
the lower bitrate bound is given by $$br_{min} = \frac{S_{Tot}}{(N'+1)} \times f_{frame}.$$

and/or
the upper bitrate bound is given by $$br_{max} = \frac{S_{Tot}}{(N'-1)} \times f_{frame}.$$

7. The method of claim 1, wherein
  at least some frames of the sequence of frames comprise a bitrate code parameter;
  a value of the bitrate code parameter corresponds to a start code and/or a stop code; and
  the subsequence is determined from the sequence of frames based on the start code and/or the stop code.

8. The method of claim 7, wherein the subsequence is determined such that
  the frame at the beginning of the subsequence comprises a bitrate code parameter which corresponds to the start code;
  the frame at the end of the subsequence comprises a bitrate code parameter which corresponds to the stop code; and
  no other frame of the subsequence comprises a bitrate code parameter which corresponds to the start code or the stop code.

9. The method of claim 7, wherein the start code is equal to the stop code.

10. The method of claim 7, wherein only frames which comprise a wait_frames parameter comprise a bitrate code parameter.

11. The method of claim 7, wherein
  the estimate $br_{est}$ of the bitrate br of the bitstream is representable in a floating point representation comprising a mantissa $f_{brCorr}$ and an exponent k;
  the exponent k is determined based on the lower bitrate bound $br_{min}$ and/or based on the upper bitrate bound $br_{max}$ of the bitrate br; and
  the mantissa $f_{brCorr}$ is determined based on the bitrate code parameter of one or more frames of the subsequence.

12. The method of claim 11, wherein
  the floating point representation is a binary floating point representation such that $br_{est} = f_{brCorr} \times 2^k$; and
  the mantissa $f_{brCorr}$ takes on values between 1 and 2.

13. The method of claim 12, wherein
  the bitrate code parameter of a frame takes on L different bitrate code values; with L being an integer greater than one;
  the L bitrate code values are different from the start code and/or stop code; and
  the mantissa $f_{brCorr}$ depends on the bitrate code values of one or more frames of the subsequence.

14. The method of claim 7, wherein the bitrate code parameter comprises two bits.

15. The method of claim 1, wherein
  the bitstream exhibits an average bitrate, referred to as ABR; and/or
  the bitstream adheres to a buffer model and uses the wait_frames parameter to signal the state of that buffer model; and/or
  the frame rate $f_{frame}$ of the bitstream is constant.

16. An audio and/or video signal processing device for processing a bitstream; wherein the bitstream comprises a sequence of encoded frames; wherein the frames of the sequence of encoded frames comprise a varying number of bits; wherein the frames of the sequence of encoded frames correspond to excerpts of an audio and/or video signal, wherein the excerpts have a constant temporal length; wherein at least two frames of the sequence of encoded frames comprise a wait_frames parameter; wherein the wait_frames parameter of a frame is indicative of a number of frames and/or a time interval that the corresponding frame is to be delayed in a buffer of the audio and/or video signal processing device prior to processing of the frame by the audio and/or video signal processing device; wherein the audio and/or video signal processing device is configured to
  determine a total number of bits $S_{Tot}$ for N frames of a subsequence of frames from the bitstream;
  determine a corrected number N' of frames based on the number N of frames and based on a difference between the wait_frames parameters of a first frame and a second frame of the subsequence; wherein the first frame corresponds to the frame at a beginning of the subsequence; and wherein the second frame corresponds to the frame at an end of the subsequence;
  determine a lower bitrate bound $br_{min}$ and an upper bitrate bound $br_{max}$ of a bitrate br of the bitstream based on the total number of bits $S_{Tot}$, based on the corrected number N' of frames and based on a frame rate $f_{frame}$ of the bitstream;
  determine an estimate $br_{est}$ of a bitrate br of the bitstream from the lower bitrate bound and an upper bitrate bound;
  store frames of the sequence of encoded frames in the buffer of the audio and/or video signal processing device;
  process the frames of the sequence of encoded frames, wherein processing the frames of the sequence of encoded frames comprises inserting the encoded frames into a multiplexed bitstream or decoding the sequence of encoded frames; and
  output the multiplexed bitstream or the decoded frames from the audio and/or video signal processing device;
  wherein one or more of determining a total number of bits, determining a corrected number N' of frames, determining a lower bitrate bound $br_{min}$ and an upper bitrate bound $br_{max}$, determining the estimate of the bitrate, storing frames of the sequence, processing the frames of the sequence, and outputting the multiplexed bitstream or the decoded frames is implemented, at least in part, by one or more hardware elements of the audio and/or video signal processing device.

17. An audio and/or video signal processing device for processing an audio and/or video signal to generate a bitstream having a bitrate br; wherein the audio and/or video signal processing device is configured to:
  receive the audio and/or video signal;
  encode the audio and/or video signal to generate a sequence of encoded frames; wherein the frames of the sequence of encoded frames correspond to excerpts of the audio and/or video signal, wherein the excerpts have a constant temporal length; wherein the frames of the sequence of encoding frames comprise a varying number of bits;
  assemble the sequence of encoded frames into the bitstream having the bitrate br; and
  output the bitstream having the bitrate br from the audio and/or video signal processing device;
  wherein at least two frames of the sequence of encoded frames include a wait_frames parameter; wherein the wait_frames parameter of a frame is indicative of a number of frames and/or a time interval that the corresponding frame is to be delayed by a multiplexing device and/or by a decoding device prior to processing of the frame by the multiplexing device and/or by the decoding device;
  wherein at least two frames of the sequence of encoded frames include a bitrate code parameter; wherein the bitrate code parameter takes on different bitrate code values; wherein the bitrate code values of the inserted bitrate code parameters depend on the bitrate br of the bitstream; wherein an estimate $br_{est}$ of the bitrate br of the bitstream is representable in a floating point representation comprising a mantissa $f_{brCorr}$ and an exponent k; wherein the precision of an initial estimate of the bitrate br is determined by a multiplexing device and/or a decoding device based on the wait_frames parameters comprised within the bitstream; wherein the initial estimate defines a lower bound $br_{min}$ and an upper bound $br_{max}$ of the bitrate br; wherein the exponent k of the estimate $br_{est}$ determined based on the lower bitrate bound $br_{min}$ and/or based on the upper bitrate bound $br_{max}$ of the bitrate br; and wherein the mantissa $f_{brCorr}$ is determined by the multiplexing device and/or the decoding device based on the bitrate code parameter; and wherein one or more of receiving the audio and/or video signal, encoding the audio and/or video signal, assembling the sequence of encoded frames, and outputting the bitstream is implemented, at least in part, by one or more hardware elements of the audio and/or video signal processing device.

18. A method, performed by an audio and/or video signal processing device, for processing a bitstream; wherein the bitstream comprises a sequence of encoded frames; wherein the frames of the sequence of encoded frames comprise a varying number of bits; wherein the frames of the sequence of encoded frames correspond to excerpts of an audio and/or video signal; wherein at least one frame of the sequence of encoded frames comprises a bitrate code parameter; the method comprising providing a lower bitrate bound $br_{min}$ and an upper bitrate bound $br_{max}$ of a bitrate br of the bitstream;

determining an exponent k based on the lower bitrate bound $br_{min}$ and/or based on the upper bitrate bound $br_{max}$ of the bitrate br;

determining a mantissa $f_{brCorr}$ based on the bitrate code parameter of one or more frames of the sequence of encoded frames;

determining an estimate $br_{est}$ of the bitrate br of the bitstream in a floating point representation comprising the mantissa $f_{brcorr}$ and the exponent k;

storing frames of the sequence of encoded frames in a buffer of the audio and/or video signal processing device;

processing the frames of the sequence of encoded frames, wherein processing the frames of the sequence of encoded frames comprises inserting the encoded frames into a multiplexed bitstream or decoding the sequence of encoded frames; and outputting, from the audio and/or video signal processing device, the multiplexed bitstream or the decoded frames;

wherein one or more of providing a lower bitrate bound $br_{min}$ and an upper bitrate bound $br_{max}$, determining the exponent k, determining the mantissa $f_{brCorr}$, determining an estimate of the bitrate, storing frames of the sequence of encoded frames, processing the frames of the sequence of encoded frames, and outputting the multiplexed bitstream or the decoded frames, is implemented, at least in part, by one or more hardware elements of the audio and/or video signal processing device.

19. A non-transitory computer readable storage medium comprising a sequence of instructions, wherein, when an audio signal processing device executes the sequence of instructions, the audio signal processing device performs the method of claim 1.

20. A non-transitory computer readable storage medium comprising a sequence of instructions, wherein, when an audio signal processing device executes the sequence of instructions, the audio signal processing device performs the method of claim 18.

* * * * *